Dec. 20, 1960 W. P. WONNEBERGER 2,965,140
MEASURING APPARATUS
Filed June 2, 1958
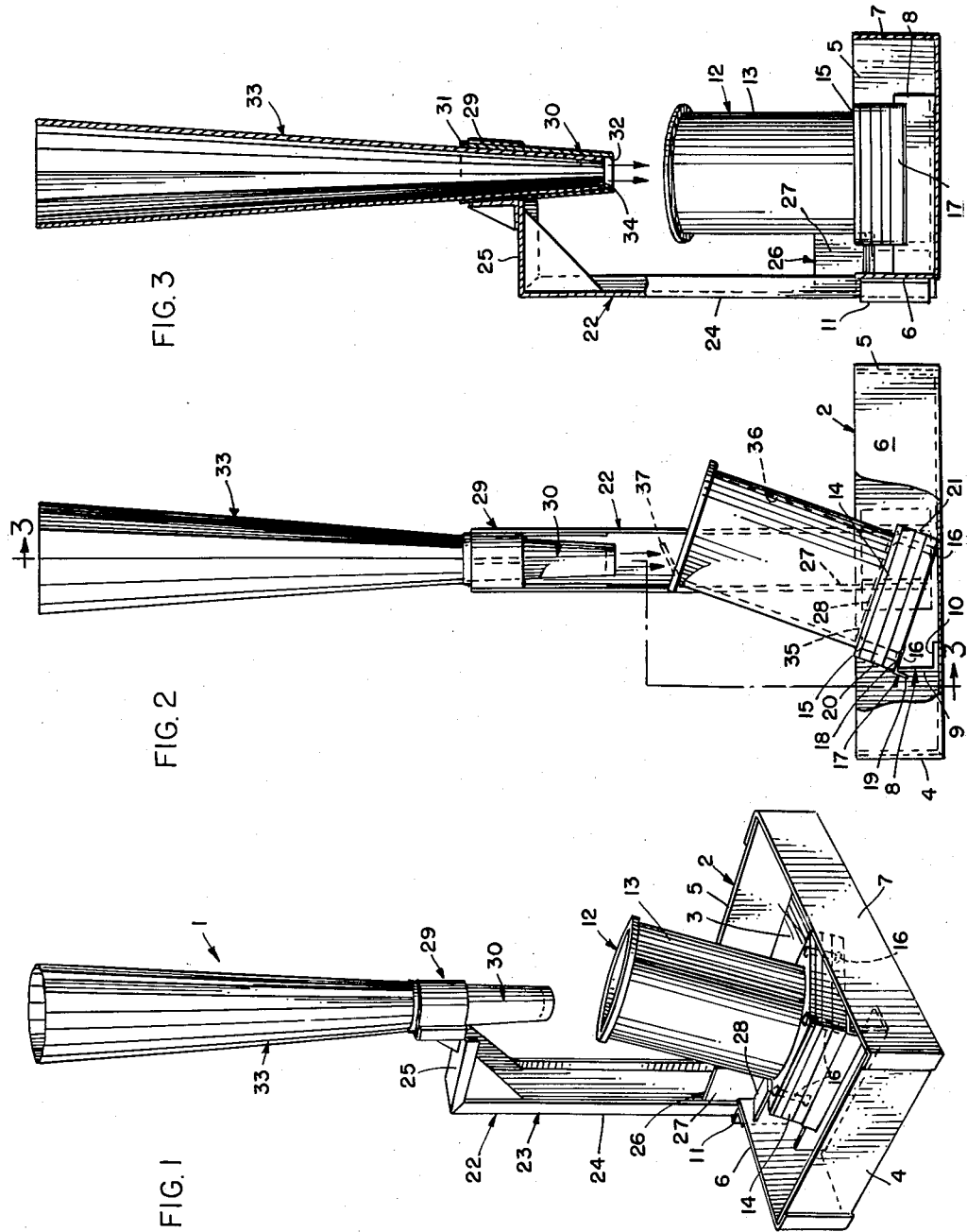
INVENTOR:
WILLIAM P. WONNEBERGER
BY
Marzall, Johnston, Cook & Root
ATT'YS United States Patent Office 2,965,140
Patented Dec. 20, 1960

2,965,140

MEASURING APPARATUS

William P. Wonneberger, Forest Park, Ill., assignor to Automatic Canteen Company of America, Chicago, Ill., a corporation of Delaware Filed June 2, 1958, Ser. No. 739,186

6 Claims. (Cl. 141—1)

This invention relates to measuring apparatus and, more particularly, to apparatus particularly well adapted for measuring powdered or granular material such as, for example, ground coffee and the like.

In certain instances it is desirable to accurately volumetrically measure predetermined amounts of powdered or granular material such as, for example, ground coffee and the like. For example, when it is desired to determine the density of a sample of ground coffee by weighing a predetermined volume thereof, it is necessary that the volumetric measurement of the coffee to be weighed be accurate in order to afford accurate test results. Heretofore, the methods and apparatus used for volumetrically measuring such materials have commonly been unreliable and afforded inaccurate results. It is a primary object of this invention to enable accurate measuring of such materials to be accomplished.

According to my present theory of this invention, one of the important reasons why such volumetric measuring has heretofore produced inaccurate results is that the apparatus and methods used have commonly resulted in unintended variations in the packing of the material in the measuring container during the filling of the latter. It is another important object of this invention to enable a measuring container to be filled in a novel and expeditious manner whereby the packing of the material therein is uniform from one filling operation to another.

Another object of the present invention is to afford novel apparatus which, in use, consistently affords accurate volumetric measuring of such materials.

A further object is to afford novel apparatus of the aforementioned type which is relatively small in size, and is relatively simple in construction and operation.

Another object of the present invention is to afford novel apparatus of the aforementioned type which may be readily maintained.

Yet another object of the present invention is to afford a novel measuring device of the aforementioned type which embodies novel parts constituted and arranged in a novel and expeditious manner.

A further object is to enable novel apparatus of the aforementioned type to be so constructed that the parts thereof are constituted and arranged in a manner whereby they may be quickly and easily assembled and disassembled, so as to enable the apparatus to be readily transportable in disassembled condition while affording apparatus which may be quickly assembled so that it is quickly available in assembled condition for the purpose of making volumetric measurements of material to be tested.

Another object of the present invention is to afford a novel method for measuring the density of powdered or granular material such as, for example, ground coffee and the like.

Another object is to afford a novel device of the aforementioned type which is efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view of a measuring device embodying the principles of the present invention;

Fig. 2 is a front elevational view of the measuring device shown in Fig. 1; and

Fig. 3 is a longitudinal sectional view taken substantially along the line 3—3 of Fig. 2.

The measuring device 1, embodying the principles of my invention, is shown in the drawings to illustrate the preferred embodiment of my invention.

The measuring device 1 includes an open topped, substantially rectangular-shaped box 2 having a bottom wall 3, two end walls 4 and 5, a rear wall 6 and a front wall 7. An elongated straight supporting bracket 8, which is substantially L-shaped in cross section and embodies two perpendicularly disposed legs 9 and 10, is mounted between the rear wall 6 and the front wall 7 in substantially perpendicular relation thereto, with the leg 10 disposed in juxtaposition to the upper face of the bottom wall 3, and with the leg 9 projecting substantially perpendicularly upwardly from the bottom wall 3. The box 2 and the supporting bracket 8 may be made of any suitable material such as, for example, steel, and may be permanently secured together such as by welding. Another mounting bracket 11, which is substantially channel-shaped in form is welded or otherwise permanently secured to the outer face of the rear wall 6 substantially centrally of the length thereof and in outward projecting relation thereto for a purpose which will be discussed in greater detail presently.

The measuring device 1 also includes a measuring cup 12 which includes an open topped, cylindrical-shaped body member 13 mounted on a base 14, which base is preferably in the form of a substantially square-shaped block. The body member 13 has an outwardly projecting flange 15 formed integrally with the bottom portion thereof, the flange 15 preferably being square in shape and of the same width and breadth as the base 14. The body member 13 is secured to the upper face of the base 14 by suitable means, such as screws or bolts 16, which extend through the base 14 and are threadedly engaged in the flange 15. The body member 13 is preferably made of aluminum, stainless steel, or the like, and the base 14 may be made of any suitable material such as, for example, wood or a suitable synthetic plastic material, or the like.

Another straight elongated bracket 17 is mounted on the base 14 in underlying relation thereto. The bracket 17 is of substantially inverted L-shaped cross section having an upper leg 18 and another leg 19 disposed in depending perpendicular relation thereto. The bracket 17 is attached to the bottom of the block 14 by two of the bolts 16 with the leg 18 disposed in juxtaposition to the lower face of the base 14, and with the leg 19 disposed substantially in alignment with one side 20 of the base 14.

When the measuring cup 12 is disposed in operative position in the box 2, as shown in Figs. 1 to 3, the bracket 17 rests on the top edge of the supporting bracket 8, with the leg 19 hooked thereover, and with the lower edge of the side 21 of the block 14, opposite to the side 20, resting on the upper face of the bottom wall 3 of the box 2.

Thus, it will be seen that, with the measuring cup 12 disposed in such operative position, the substantially cylindrical-shaped body member 13 thereof is tilted from vertical position toward the end wall 5 of the box 2 at an acute angle. Preferably, the bracket 8 is disposed in such position in the box 2, and the measuring cup 12 is of such size that, when the latter is disposed in such operative position it is centered between the end walls 4 and 5, and between the walls 6 and 7, in spaced relation thereto.

My novel measuring device 1 also embodies another supporting bracket 22 which includes an elongated, substantially inverted L-shaped body member 23 having a long leg 24 and a short leg 25 disposed substantially perpendicularly to each other. The legs 24 and 25 are substantially channel-shaped in cross section, with the leg 24 normally disposed in upright position, and with the leg 25 disposed at the upper end of the leg 24. The lower end portion of the leg 24 is disposed in the bracket 11 of the box 2 and fits therein with a snug but freely slidable fit so that it may be readily inserted into, and removed from the bracket 11, but when it is disposed in the bracket 11, it is supported thereby in a positive manner in upright position adjacent to the rear wall 6.

A clamping plate 26 is also secured to the lower end portion of the leg 24 of the bracket 22. The plate 26 has a substantially inverted L-shaped body portion 27 disposed in upright position, and a flange 28 projecting upwardly from the lower edge of the body portion 27 at the same acute angle to the horizontal as the top face of the flange 15 of the cup 12, when the latter is disposed in normal position on the bracket 8. The plate 26 may be made of suitable material such as, for example, steel, and the upper end portion thereof is welded, or otherwise suitably secured to the side of the leg 24 of the bracket 22 in such position that, when the bracket 22 is disposed in normal position in the bracket 11, the lower end portion of the body portion 27 is hooked over the wall 6 of the box 2 to assist in supporting the bracket 22. Also, the body portion 27 of the plate 26 is of such size, and is so positioned, that when the cup 12 is properly positioned in the box 2, the body portion 13 of the cup 12 is disposed in abutting engagement with the adjacent vertical edge of the plate 26, and the flange 28 is disposed in closely overlying juxtaposition to the upper face of the flange 15, to thereby insure the proper positioning of the cup 12, which is important in controlling the accuracy of the volumetric measurement of the device 1.

The leg 25 of the supporting bracket 22 projects forwardly from the upper end portion and is normally disposed in upwardly spaced, overlying relation to the box 2. A substantially annular-shaped collar or ring member 29 is mounted on the front free end of the leg 25 in forwardly disposed relation thereto, with the axis of the ring member 29 disposed in parallel relation to the longitudinal center line of the leg 25.

An inverted truncated supporting cone 30 is disposed in and supported by the ring member 29. The cone 30 is of such size that the upper end portion 31 thereof fits snugly within the ring member 29, and the lower end 32 of the cone 30 is disposed in upwardly spaced relation to the measuring cup 12, when the measuring cup 12 and the supporting bracket 22 are disposed in operative position on the box 2. The body member 23, the ring member 29, and the supporting cone 30 may all be made of suitable material such as, for example, steel, and may be permanently secured together such as by welding.

My novel measuring device also embodies an inverted truncated measuring cone or funnel 33, which is preferably polygonal in transverse cross-sectional shape, and which may be made of any suitable material such as, for example, aluminum. The measuring cone 33 is of such size and shape that when it is disposed in inverted position in the supporting cone 30, the lower end portion thereof fits snugly within the supporting cone 30, so that the measuring cone 33 is relatively rigidly supported in the supporting cone 30 with the lower end 34 of the cone 33 disposed in upwardly spaced relation to the lower end 32 of the supporting cone 30.

When the box 2, the measuring cup 12, the supporting bracket 22, and the measuring cone 33 are disposed in operative position as shown in Figs. 1 to 3, they are preferably positioned so that a line running longitudinally through the longitudinal axis of the measuring cone 33 passes downwardly through the open top of the body member 13 of the measuring cup 12, and intersects the bottom 35 of the body member 13 at a point substantially midway between the center of the bottom wall 35 and the inner peripheral edge thereof which is disposed closest to the end wall 5 of the box 2. The lower end 32 of the supporting cone 30 has an inside diameter which is several times larger than the grains or particles which are to pass therethrough, and is preferably of such inside diameter that a vertical projection thereof onto the upper face of the bottom wall 35 of the measuring cup 12 passes closely adjacent to, but in inwardly spaced relation to the upper edge portion of that portion of the side wall 36 of the body member 13 facing toward the end wall 4 of the box 2, and defines a circle on the upper face of the bottom wall 35, which is disposed in inwardly spaced relation to the inner surface of the side wall 36 of the body member 13 of the measuring cup 12.

The measuring cone 33 has a greater internal volumetric capacity than that of the body member 13 of the measuring cup 12, for a purpose which will become more apparent hereinafter.

In the practice of my novel method of measuring predetermined volumetric amounts of material such as, for example, ground coffee, using my novel measuring device 1, the interior of the body member 13 of the measuring cup 12 may be cleaned with a clean dry cloth, and the interior of the supporting cone 30 and the measuring cone 33 may be cleaned with carbon tetrachloride and air dried. Thereafter, the interior of the cones 30 and 33 may be wiped with a clean dry cloth and the box 2, the measuring cup 12 and the supporting bracket 22 may be disposed in assembled relation to each other as shown in Figs. 1 to 3. Thereafter, the operator may place his finger over the end 32 of the supporting cone 30 to close the same, and he may then fill the measuring cone 33 with the ground coffee to be measured. After the measuring cone 33 has been completely filled, the operator may remove his finger from the lower end 32 of the supporting cone 30, and give the measuring cone 33 a light tap to insure free flow of the coffee from the cones 33 and 34. The coffee passing from the measuring cone 33 and the supporting cone 30 passes downwardly through the open top of the body member 13 of the measuring cup 12, and fills the measuring cup 12 to overflowing so that the last portion of the coffee in the measuring cone 33 overflows the cup 12 into the box 2. After all of the coffee has passed from the measuring cone 33 and the supporting cone 30 into the measuring cup 12, the operator may place a suitable elongated straight knife or scraper, such as the scraper 37 shown in broken lines in Fig. 2, firmly against the upper edge portion of the upper lip of the measuring cup 12, and with the scraper 37 disposed in position to extend completely across the body member 13, pass the scraper 37 downwardly across the open top of the measuring cup 12 with the scraper 37 disposed at a forty-five degree angle and disposed in firm engagement with the upper edge of the measuring cup 12, to thereby scrape off the excess coffee with one stroke. The measuring cup 12 may then be removed from the box 2 and all excess coffee clinging to the outside area of the cup 12 may be removed by wiping with a clean dry cloth, and the coffee may be poured from the measuring cup 12 onto a scale not shown, and weighed. The process should be carried out in a location which is free of vibrations.

If desired, this process may be repeated a plurality of times, such as, for example, ten times, to determine the average density weight, although it has been found that my novel measuring device and my novel method of measuring afford such accurate results as to render such repetition unnecessary.

As previously mentioned, when coffee, and the like, has been heretofore measured volumetrically in tests for determining the density thereof, the measuring containers were commonly filled in such a manner that the packing of the material therein varied to such an extent that inaccurate results were obtained. With my novel measuring device, and practicing my novel method of measuring, it has been found that accurate results are obtained which are consistently accurate within one-tenth of a gram when using a measuring container such as the cup 12, having a volumetric capacity of more than fourteen and three-eighths cubic inches. It is my present theory that this exceptional accuracy when using my novel measuring device and practicing my novel method of measuring is due, to a great extent, to the fact that the parts of my novel measuring device are so constituted and arranged, and the measuring cup thereof is filled in such a manner, that the material fills the measuring cup in such a way that, during the filling thereof, the material slides and rolls over the surfaces of the measuring cup, and the upper surface of the material already discharged into the measuring cup, in such a manner that the packing to which it is subjected is uniform from one filling operation to another. In other words, the cup is disposed at an angle approximating, but not exceeding the angle of repose of the material. In any event, suprisingly accurate results are obtained in the volumetric measuring of ground coffee, and the like, by the use of my novel measuring device and in the practice of my novel method of measuring such material.

In one form of my novel measuring device which has been found to be highly effective in producing consistently accurate results, the box 2 has an inside length of six and fifteen-sixteenths inches, an inside width of four and one-half inches, and an inside depth of one and seven-sixteenths inches. The supporting bracket 8 thereof projects upwardly above the bottom wall 3 of the box 2 a distance of three-quarters of an inch. In this same device, the body member 13 of the measuring cup 12 has an inside diameter of two and one-sixteenths inches, and an inside height of four and one-thirty-second inches, with the overall height of the cup 12 being four and nine-thirty-seconds inches. The base 14 of this device is two and one-half inches in width and breadth.

The measuring cone 33 of this last mentioned device is so constructed as to have an overall height of ten and five-eighths inches, with the top having an inside diameter of two and one-eighth inches, and the bottom having an inside diameter of three-eighths of an inch. The supporting cone 30 of this device has an inside diameter of seven-sixteenths of an inch at the lower end 32 thereof and is of such size and configuration that the measuring cone 33 is supported therein in operative position with the lower end 34 disposed three-eighths of an inch above the lower end 32. The supporting bracket 22 of this device is of such length that the lower end 32 of the supporting cone 30 is disposed six inches above the upper face of the bottom wall 3 of the box 2 when the supporting bracket 22 is disposed in operative position on the box 2.

As will be appreciated by those skilled in the art, the exact dimensions of the above mentioned one particular device embodying my novel invention are set forth herein by way of illustration, and not by way of limitation, and such dimensions may be varied without departing from the purview of my invention and while still affording a measuring device wherein the parts thereof are constituted and arranged relative to each other in the manner disclosed herein, and in accordance with the principles of my invention.

From the foregoing it will be seen that I have afforded novel measuring apparatus which is particularly well adapted for accurately volumetrically measuring predetermined volumetric amounts of ground coffee, and the like.

Also, it will be seen that I have afforded a novel measuring device, the parts thereof being relatively small in size and readily assembled and disassembled relative to each other, so as to afford a relatively portable device.

In addition, it will be seen that I have afforded a novel measuring device which may be readily and economically produced commercially and is effective and efficient in operation.

Furthermore, it will be seen that I have afforded a novel method of volumetrically measuring ground coffee, and the like, and particularly for so measuring such materials in testing procedures for determining the densities thereof.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. The method of measuring ground coffee comprising filling a hollow, inverted truncated cone-shaped member having a downwardly directed discharge spout with such coffee to a level affording more than a predetermined volume of said coffee, feeding said coffee by gravity vertically downwardly from said discharge spout into an open-topped cylindrical-shaped container of said volume and having a flat bottom wall, and closed side walls disposed substantially perpendicular to said flat bottom wall, with said side walls and bottom wall disposed at an acute angle to the horizontal which is substantially but not greater than the angle of repose of said coffee, to thereby fill said container to overflowing in all directions, and then striking off all said coffee from above the top of said container by moving an elongated blade transversely across the top of said container in contact therewith.

2. A measuring device for measuring granular material comprising a base, a container mounted on said base, said container having an open top, a closed flat bottom, and sidewalls projecting upwardly from said bottom, means on said base supporting said container in upstanding position with said bottom disposed at an acute angle to the horizontal approximating but not greater than the angle of repose of said material, a funnel member for holding a supply of such granular material, and means on said base and engaged with said funnel in position to support said funnel in position to discharge said granular material therefrom through said open end directly toward said bottom and in position to fill said container to overflowing in all horizontal directions.

3. A measuring device as defined in claim 2 and in which said container is cylindrical in shape.

4. A measuring device as defined in claim 2 and in which said means supporting said container includes an upwardly projecting bracket on said base, and in which a downwardly projecting bracket is mounted on the bottom of said container and hooked over said first mentioned bracket in position to releasably hold said container at said angle.

5. A measuring device as defined in claim 2 and in which said base has an upstanding side wall, and in which said means for supporting said funnel includes a supporting bracket removably mounted on said side wall and normally supportingly engaged with said funnel.

6. A measuring device for measuring granular material comprising a base, a container mounted on said base, said container having an open top, a closed flat bottom, and sidewalls projecting upwardly from said bottom, means on said base supporting said container in upstanding position with said bottom disposed at an acute angle to the horizontal, said acute angle being within the region of but not greater than the angle of repose of said material, a funnel member for holding a supply of such granular material and having a discharge opening in the bottom thereof, and means engaged with said funnel in position to support said funnel in position to feed said granular material in a vertical stream from said discharge opening into said open top, said container being so disposed relative to said funnel, and said funnel having such a volumetric capacity, as to fill said container to overflowing in all horizontal directions when said complete supply of granular material is so fed from said funnel.

References Cited in the file of this patent

UNITED STATES PATENTS

| | | |
|---|---|---|
| 178,997 | Clarke | June 20, 1876 |
| 486,762 | Camden | Nov. 22, 1892 |
| 545,915 | Russell | Sept. 10, 1895 |
| 918,355 | McGowan | Apr. 13, 1909 |
| 1,310,567 | Harbord | July 22, 1919 |
| 2,011,910 | Robbins | Aug. 20, 1935 |
| 2,536,419 | Brunnell et al. | Jan. 2, 1951 |
| 2,728,510 | Dunnican et al. | Dec. 27, 1955 |